Patented Sept. 8, 1931

1,822,536

UNITED STATES PATENT OFFICE

FREDERICK MAAS, OF NEW YORK, N. Y., ASSIGNOR, BY MESNE ASSIGNMENTS, TO WILLIAM MANO, OF FLUSHING, LONG ISLAND, NEW YORK

COATING AND SEALING COMPOSITION

No Drawing. Application filed September 14, 1926, Serial No. 135,491. Renewed June 10, 1930.

This invention relates to a composition of matter suitable for use as a paint, a cement, a pipe joint compound and for similar or analogous uses.

A paint or similar composition which can be economically manufactured and which is composed of cheap ingredients capable of withstanding the action of heat and of the atmosphere for indefinite periods has long been sought. It is especially desirable that such a composition be carried by an inexpensive vehicle and that it should dry rapidly. It is further desirable that after drying it should be hard but comparatively elastic so as not to crack under changes in temperature and that it be practically insoluble in and substantially unaffected by acids, gases and oils of various kinds.

No paint has heretofore been known which is resistant to and unaffected by that solution of acid, gas and oil which condenses from ordinary illuminating gas and which is commonly known in the art of gas manufacture as "drip oil." Further, no paint has heretofore been known which prevents the deposit of naphthalene in, and the consequent clogging of, the gas conducting lines used in the manufacture of illuminating gas.

Serious trouble has also been encountered heretofore in the manufacture of illuminating gas by reason of the fact that the paint covering or protecting the pipe is attacked by the drip oil and dissolved. Furthermore, any of the materials heretofore used as a pipe joint compound for sealing the pipe joints are similarly attacked and tend to make the joints leak.

My improved composition, however, prevents incrustation of naphthalene, is unaffected by drip oil, and is an ideal pipe protector and pipe joint compound. It fulfills all of the requirements above set forth and has other desirable qualities as will be clear from the description which follows.

In place of the oil and oil colors which are at present customarily used in most paints as solvents and coloring materials respectively, I employ water as the vehicle in which the paint and colors are carried thereby attaining the advantages of economical manufacture, quick drying and economy of material, while at the same time avoiding the disadvantages of the previously known water paints which are affected by water.

In the manufacture of my improved composition, I prefer to make a solution of magnesium chloride which is thoroughly dissolved in water in the proportion of about 300 grams of magnesium chloride to about 300 grams of water, the chloride being stirred in the water to make sure that no undissolved particles remain. I also make a dry mixture of powdered magnesium oxide, powdered fluorspar, powdered white dextrine and powdered aluminum oxide in the preferred proportions of about 300 grams of magnesium oxide to 50 grams of fluorspar, 50 grams dextrine and 50 grams of aluminum oxide, though it will be understood that the proportions mentioned may be considerably varied without substantially affecting the properties of the composition. When the composition is to be used as a paint or wood filler, and is therefore to be colored, dry colors, preferably in the form of what are known in the trade as "earth colors" or mineral colors, which are soluble in water, are added in sufficient quantities to give the desired shade.

The liquid solution of magnesium chloride is then added to the mixed powders to form a fluid or viscous paste. The ingredients are thoroughly stirred during the mixing operation until all of the powder has been dissolved and the entire mixture has been uniformly colored and thoroughly mixed.

When the composition is to be used as a white paint or as a cement, no coloring matter is necessary unless the cement is visible in the finished object with which it is to be used, in which case coloring matter of the proper shades may be used in the same manner as above described in the production of the colored paint. To use my improved composition as a paint, it is applied with a brush or in the form of a spray in the usual manner. I find that it dries hard and practically unscratchable in about twelve hours, that after it has dried it will withstand intense heat without changing color or being otherwise undesirably affected and that it is practically fireproof. My improved composition is also unaffected by water, moisture or prolonged exposure to the action of the atmosphere. Most weak acids, salts and gases do not affect it in any way nor is it affected by salt water nor even a strong solution of lye. When the composition is to be used as a pipe joint compound, it is placed around the pipe threads in the usual manner, and when hardened not only strengthens the joint but prevents leakage.

I have found that the dextrine in my improved composition acts as a binder for the ingredients, and gives the composition efficient adhesive properties. While the magnesium chloride and magnesium oxide in commercial form often contain calcium salt impurities which tend to absorb moisture, I have found that the aluminum oxide coats the magnesium salts and protects them against the access of moisture. The fluorspar fills up the voids in the composition in somewhat the same manner as the sand in concrete fills up the voids therein and hardens the dried composition. The fluorspar also protects against the action of the carbonic acid gas in the atmosphere while the magnesium chloride and magnesium oxide form the bulk of the composition. Earth colors are used for the reason that they are not only soluble in water but that they are permanent and fast and when used in my composition, are not likely to fade or to be otherwise affected by the prolonged action of sunlight, moisture and most of the common acids, salts and gases in the strength in which they are usually encountered in use. My improved composition is also unaffected by drip oil, and absorbs naphthalene as has been above pointed out, and renders pipe joints leak-proof.

It adheres readily and firmly to glass, wood, metals and other materials so that it is also efficient as a cement for joining parts together, and particularly for a pipe joint compound in gas and oil lines. It will be understood that the quantities and proportions of the ingredients above specified may be considerably varied without materially affecting the properties of the composition.

It will be seen further that I have provided a composition which can be economically and easily manufactured in large quantities, which is fire and water proof and unaffected by most of the common paint destructive agencies so that it may last practically indefinitely, and which has a variety of other uses which will be obvious to one skilled in the art and need not therefore be here set forth in detail.

I claim:

1. A plastic coating and sealing composition, water proof and fire proof when dry and substantially unaffected by common weak acids, salts, oils and gases and particularly drip oil, and particularly adapted for use as a pipe joint compound, comprising aluminum oxide, magnesium chloride, magnesium oxide, dextrine, fluorspar and water.

2. In a plastic coating and sealing composition capable of drying in about twelve hours, a water vehicle, magnesium chloride, magnesium oxide, aluminum oxide for mixing and coating said oxide and chloride for preventing the absorption of moisture thereby, a dextrine binder and powdered fluorspar for partly filling the voids formed on the drying of said composition.

3. A plastic coating and sealing composition resistant to drip oil, comprising a solution of magnesium chloride in water to which has been added a substantially equal amount of a mixture of magnesium oxide, dextrine, fluorspar and aluminum oxide.

4. A plastic coating and sealing composition drying in about twelve hours comprising a solution of about equal parts of powdered magnesium chloride and water, to which has been added a substantially equal amount of a substantially dry mixture of about six parts magnesium oxide, one part fluorspar, one part dextrine and about one part aluminum oxide.

5. A plastic coating and sealing composition impervious to drip oil and capable of preventing incrustation deposit of naphthalene in pipe lines for illuminating gas consisting of equal parts magnesium chloride, and magnesium oxide, with about 10% aluminum oxide, and fluorspar.

6. A plastic coating and sealing composition comprising equal parts by weight of magnesium chloride, magnesium oxide and water in the greater proportion and about equal parts by weight of fluorspar, dextrine and aluminum oxide in the lesser proportion.

7. A plastic pipe joint compound including a water vehicle, magnesium oxide, magnesium chloride, and not more than 10% of aluminum oxide to protect the magnesium salts against the access of moisture.

8. A plastic pipe joint compound adapted to seal pipe joints against leakage and resistant to drip oil, comprising a water solution of magnesium chloride, and magnesium oxide, an inert silicious filler and a powdered mineral for coating the magnesium salts and preventing the absorption of moisture thereby.

FREDERICK MAAS.